April 2, 1935.   S. A. DOBYNE   1,996,464
TRIMMING MACHINE
Filed Sept. 21, 1931   2 Sheets-Sheet 2

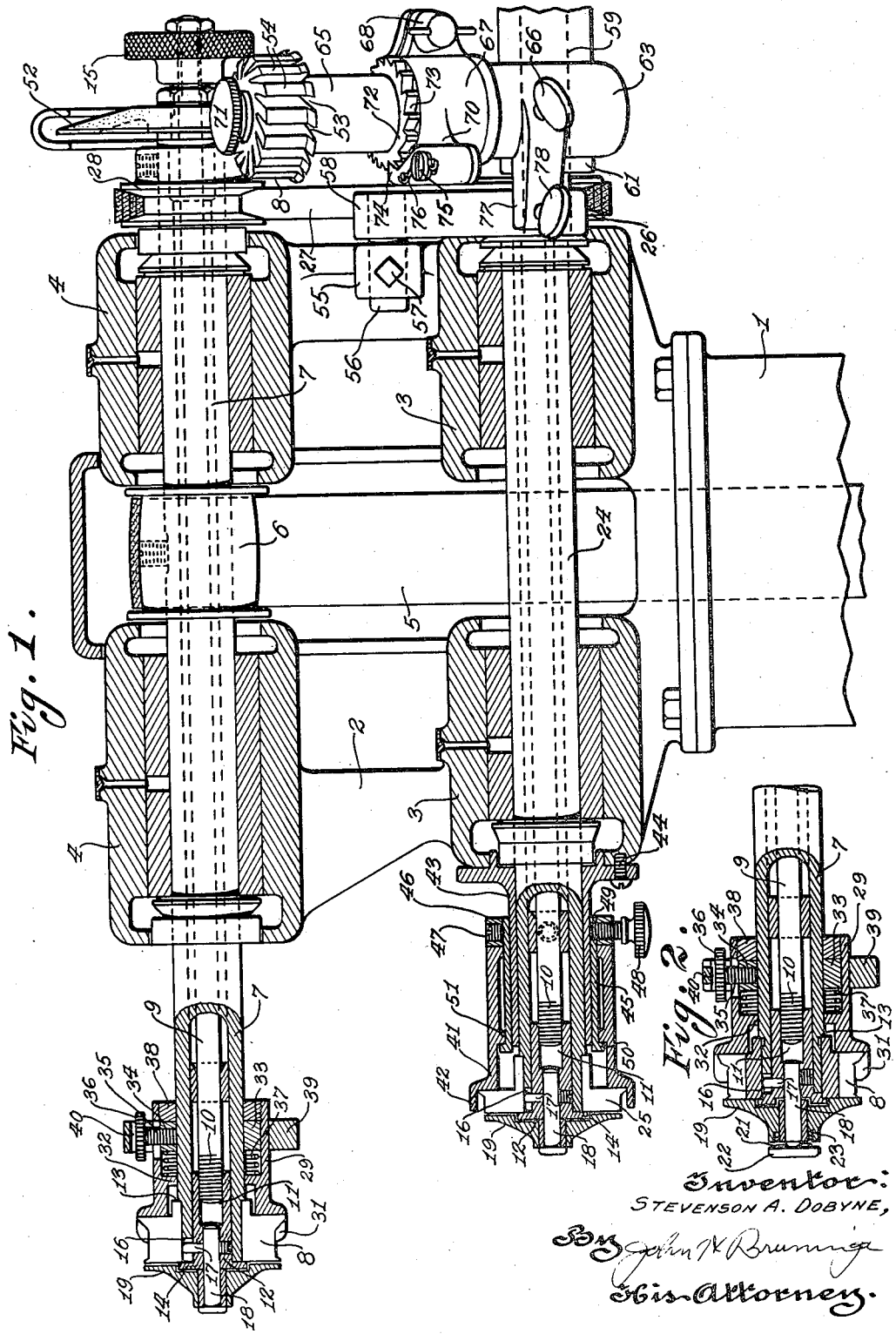
April 2, 1935.     S. A. DOBYNE     1,996,464
TRIMMING MACHINE
Filed Sept. 21, 1931     2 Sheets-Sheet 1
Inventor:
STEVENSON A. DOBYNE,
His Attorney.

Inventor:
STEVENSON A. DOBYNE,
His Attorney.

Patented Apr. 2, 1935

1,996,464

UNITED STATES PATENT OFFICE 1,996,464

TRIMMING MACHINE

Stevenson A. Dobyne, St. Louis, Mo., assignor to Champion Shoe Machinery Company, St. Louis, Mo., a corporation of Missouri Application September 21, 1931, Serial No. 563,912

4 Claims. (Cl. 12—88)

This invention relates generally to trimming machines such as are employed for the trimming of sole edges and especially to such machines as are particularly useful in shoe repair shops, in which it is desired that a plurality of different tools be operated by the same driving mechanism, so that a combination machine is provided.

In the usual trimming machine particularly for operating upon sole edges and the edges of the usual top lift which is applied to wooden heels, it is generally necessary that the shoe repairer be supplied with a number of different cutting tools which may be mounted upon his machine at will in accordance with the type of work to be operated upon. Accordingly it is extremely important that the mounting and dismounting of such tools be accomplished with facility. Heretofore, however, it has been customary, particularly in positions where the rotation of the cutting tool is in such direction that if a right-hand screw were employed the cutter would tend to work loose upon operation, it has been necessary to employ a left-hand screw assembly for securing the cutter tools in position upon their driving shafts. Such an arrangement for securing the cutter tools in position has been found to be disadvantageous for the reason that the same is oftentimes confusing to the shoe repairer and is not so easily manipulated as is desired.

The object of this invention, generally stated, is to provide a trimming machine, particularly for use in shoe repair shops in which the cutting tools may be readily mounted and dismounted.

Another object of this invention is to provide a trimming machine of the kind referred to in which the various cutter elements are provided with shields in floating relation thereto.

Another object of this invention is to provide a machine of the kind referred to with a device for uniformly and accurately grinding the cutter elements.

A more specific object of this invention is to provide a machine of the kind referred to by which the operations to be accomplished and the changes to be made in the apparatus may be accomplished with great facility and a maximum of convenience to the operator.

Other objects will become apparent to those skilled in the art when the following description is read in connection with the accompanying drawings, in which:

Figure 1 is a view in front elevation, shown partly in section to reveal the inter-connected parts of the machine and illustrating a trimming machine provided with the cutter mounting assembly and the cutter protecting shields of the present invention.

Figure 2 is a sectional view in front elevation illustrating a modified form of floating shield assembly.

Figure 3:
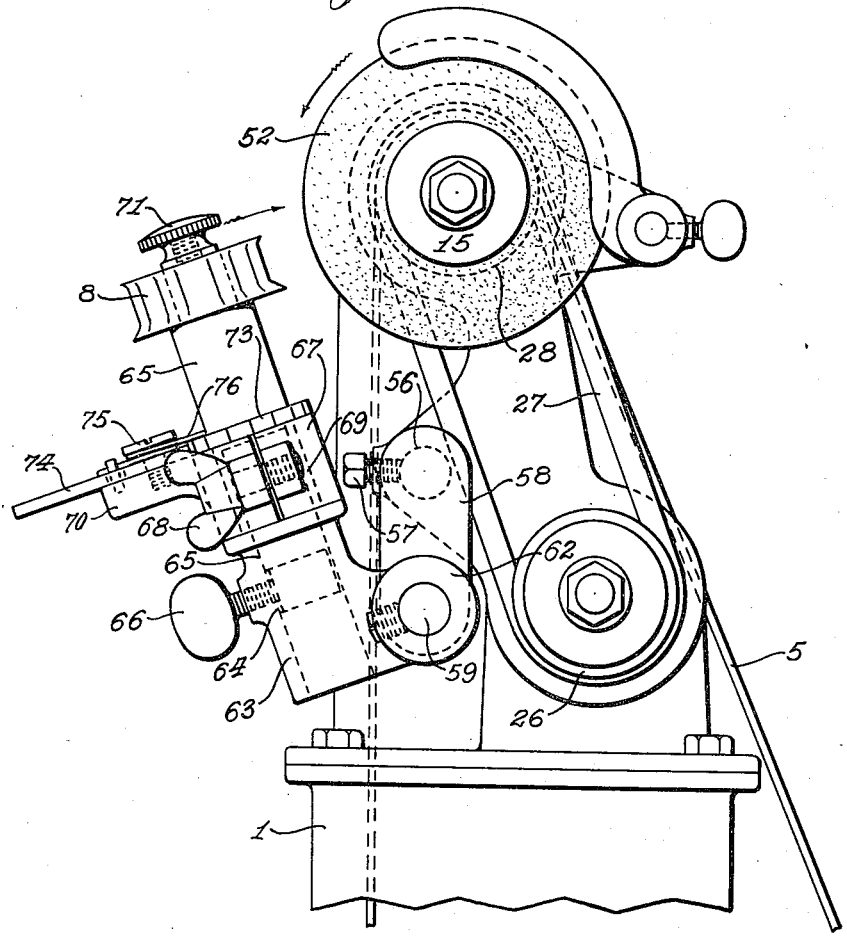
Figure 3 is a view in end elevation of the cutter grinding apparatus of the present invention.

Generally stated, in accordance with the present invention, the usual trimming machine which is employed in shoe repair shops is provided with demountable cutter elements which are secured in position by suitable means preferably extending on the interior of the driving shaft therefor, and having a manipulable part at the opposite end of the shaft from the cutter elements. Such an assembly for securing the various cutting tools in position on the operating shaft is particularly advantageous when the direction of the movement of the cutter elements is such as would tend to loosen the usual right-hand screw which might be employed. In accordance with one embodiment of the present invention the driving force is transmitted from the shaft to the cutter by means of one element which of course operates to prevent relative angular movement therebetween, while an independent means is provided for maintaining the torque receiving element in engagement. The tendency of the parts to loosen is, therefore, avoided in view of the fact that a positive means is provided for preventing relative angular movement between the respective parts. Furthermore, in accordance with the present invention suitable shields are provided which are preferably in floating relation to the cutter elements in order that under ordinary circumstances the shields will revolve with the cutter but the friction of a shoe part against the shield will be sufficient to prevent rotation thereof without interfering with the movement of the cutter. Among the features of the present invention, is the provision of a guide device for accurately grinding the cutter elements which are employed in such a machine as that referred to. In accordance with one embodiment of the present invention, a suitable grinding device such as for instance an emery wheel may be mounted so as to be driven by one of the driving shafts of the machine while mounted adjacent thereto a suitable cutter support is provided and adapted to be moved in such a manner as to accurately direct the teeth of the cutter into grinding relation with the grinder.

Referring now particularly to the drawings, a machine of the type hereinbefore referred to is provided with a suitable supporting structure such as for instance a pedestal 1. Mounted upon the top of the pedestal 1 is a frame 2, provided with a plurality of sets of journal bosses 3 and 4 within which may be mounted suitable bearing members for supporting shafts for rotation. As is clearly illustrated in Figure 1, the respective bearings of the sets 3 and 4 are spaced sufficiently to accommodate a driving belt 5 therebetween. In the embodiment illustrated, a driving pulley 6 is mounted upon a shaft 7 extending through the set of bearing bosses 4 and is disposed for engagement with the belt 5.

Detachably mounted upon one end of the shaft 7 is a sole trimming tool 8 constructed in the usual manner which may be in the form of a toothed cutter. In accordance with the present invention, the toothed cutter or trimming tool 8 is secured in position upon the end of the shaft 7 by means of a suitable clamping device and the driving torque is transmitted from the shaft 7 to the clamping device through a suitable arrangement such as a driving pin, which pin is maintained in position by independent means. As clearly illustrated in Figure 1, the shaft 7 is, in accordance with the illustrated embodiment of this invention, made hollow and extending therethrough is a rod 9 having a threaded portion 10 adapted to engage a corresponding threaded portion 11 of a clamping member 12. As is clearly illustrated in Figure 1, the outer end of the shaft 7 is reduced so that a circumferentially extending shoulder 13 is provided. Similarly the outer end of the clamping member 12 is provided with a flange 14 extending outwardly therefrom for a sufficient distance to engage the side of the cutter element 8. With the arrangement just described, it is apparent that when the cutter element 8 is assembled, as illustrated in Figure 1, the cutter will be clamped into position upon the shaft 7 upon tightening of the rod 9. In order to accomplish such tightening, a suitable manipulable portion such as for instance a knurled knob 15 may be provided on the end of the rod 9, which extends outwardly beyond the shaft 7 and illustrated at the opposite end of the shaft from the cutter element 8.

In the reduced end portion of the shaft 7, one or more axially extending notches such as 16 are preferably provided for cooperating with a pin 17 extending radially from the clamping member 12. With the arrangement just described, it is apparent that relative angular movement between the clamping member 12 and the shaft 7 is prevented and furthermore, the driving torque which is transmitted from the shaft 7 to the cutter 8 will be received by the pin 17, in view of the fact that relative angular movement between the cutter element 8 and the shaft 7 is prevented only by virtue of the frictional engagement or the clamping action of clamping member 12 against the shoulder 13. It is apparent, therefore, that with the arrangement just described, there will be no tendency for the clamping action of the member 12 to be released during rotation of the shaft since there will be no tendency for a relative movement between the clamping member 12 and the shaft 7. It will be apparent, therefore, that with such an assembly relative angular movement between the clamping member 12 and the shaft 7 is prevented by means of the pin 17 engaging the notch 16, and accordingly relative angular movement of the cutter element 8 and the shaft 7 will be virtually prevented. The rod 9, however, operates to prevent disengagement of the pin 17 from its notch 16, as well as to maintain a clamping action on the cutter element 8 between the flange 14 and the shoulder 13. When, however, it is desired to detach the cutter element 8 so that another and different cutter may be substituted therefor it is apparent that upon loosening the knob 15, the clamping member 12 will be released and the entire assembly, including the cutter element 8 and the clamping member 12, may be removed from the end of the shaft 7.

A spindle 18 may be suitably mounted in the clamping element 12 as by means of a set screw, and upon the spindle 18 a suitable shield such as 19 may be provided in swiveled relation. As is clearly apparent from an inspection of Figure 1, the shield 19 may extend outwardly adjacent the cutting edges of the tool 8 and in accordance with one embodiment of the present invention, the shield 19 is so mounted upon the spindle 18 that a slight space, such as for instance .005" may exist between the shield and the edge of the cutting element 8. In accordance with another embodiment of the present invention, illustrated in Figure 2, the shield 19 is so mounted upon the spindle 18 that no space will exist between the edge of the shield and the cutting element 8. This may be accomplished by the provision of a spring such as 21, which may be interposed between the head 22 of the spindle 18 and a suitable shoulder 23, formed on the interior of the shield 19. With either of the shield arrangements just described, it is apparent that the shield 19 will be rotatable relative to the spindle 18, and although under ordinary circumstances and especially if such a spring as 21 be provided the tendency will be for the shield to rotate with the cutter element 8. It is apparent that if a shoe part be brought into engagement with the shield 19 the friction thereof will be sufficient to cause the same to stop without interfering with the movement of the cutter element 8. Accordingly, with the provision of such a shield there will be no danger of marring a shoe being operated upon by inadvertently bringing a portion thereof into contact with a rotating part.

Mounted in bearing bosses 3 is a shaft 24 which carries at one end thereof a trimming tool 25, which may be in the nature of a toothed cutter adapted particularly for heel trimming, and it will be apparent from an inspection of Figure 1 that the detachable mounting arrangement for the tool 25 is identical with the mounting arrangement which has been described for the tool 8, and accordingly like reference characters have been applied to the parts corresponding to those parts which have been specifically described with reference to the sole trimming cutter 8. It may be pointed out that the shaft 24 may be driven by any suitable means, which in the illustrated embodiment, is accomplished through a pulley 26 mounted upon the end thereof opposite the cutter 25, adapted to be engaged by a suitable belt such as 27 which may be driven from a pulley 28 mounted upon the shaft 7.

A second protecting shield 29 is preferably provided for cooperating with the trimmer 8. In the embodiment illustrated, the shield 29 is provided with portions 31 which may extend as fingers into the notches which exist between the respective teeth of the cutter 8, and in accordance with the present invention, a suitable adjustable mounting for the shield 29 is provided which will permit slight relative movement thereof in an axial direction with respect to the shaft 7 and the cutter 8. The shield 29 may be formed in the nature of a sleeve having inwardly extending flanges 32 cooperating with the shaft 7 and adapted to guide the shield in its movement along the shaft 7 upon adjustment thereof. Mounted in the recessed portion between the flange 32 and the end of the sleeve suitable adjusting mechanism may be provided which, in the embodiment illustrated, comprises a collar 33, having a threaded portion 34, adapted to receive a thumb screw 35, having a knurled head 36. Interposed between the collar 33 and the flange 32, a suitable coil spring as 37 may be provided and the assembly, including the spring 37 and the collar 33, may be secured within the recess by means of a suitable plug as 38 which may be threaded into the sleeve portion of the shield 29. With the arrangement just described, it is apparent that upon tightening the thumb screw 35, the end thereof will engage the shaft 7 and the collar 33 will be forced into similar contact with the interior of the shield 29 so that the shield will be positioned with reference to the shaft 7. When, however, it is desired to adjust the shield 29 either to the right or to the left the opposite procedure may be followed—that is, the thumb screw 35 may be released and the shield positioned, whereupon the screw 35 may be again tightened. During operation of the cutter 8, however, the operator often desires to make use of a greater portion of the cutter than is exposed between the fingers 31 of the shield 29 and the edge of the shield 19, and it is apparent that when the greater area of the cutter 8 is desired, the edge of the sole being operated upon may be forced against the fingers 31 and the shield 29 will be readily moved against the action of the spring 37. When, however, the parts are in their normal position, it is apparent that the spring 37 will operate to maintain the fingers 31 in such position that the inner extending points of the cutter 8 are protected and prevented from damaging articles which may be brought into contact therewith. In view of the fact that the shield 29 is adapted to rotate with the shaft 7, means is provided for protecting the extending knurled head 36 of the thumb screw 35 from accidentally engaging with articles which may be in the vicinity thereof. In order to thus protect the head 36 of the screw 35, a ring such as 39 may be suitably connected to the exterior of the shield 29, and provided with a recessed portion 40 for accommodating the head 36 of the screw 35. Such a ring as 39 may have a continuous periphery in order that the obstruction which would otherwise be presented by the head 36 may be guarded while it is apparent from Figure 1 that sufficient of the head 36 is exposed beyond the edges of the ring 39 to permit manipulation thereof.

A slightly modified form of shield is, however, desirable for use in connection with the heel trimming cutter such as 25. In the embodiment illustrated in Figure 1, a shield 41 is provided for use in connection with the cutter 25, the shield 41 is provided with a protecting flange 42, extending adjacent the cutting edges of the tool 25. In order to support the shield 41, a sleeve such as 43 may be mounted upon the frame work and secured to one of the bearing bosses 3 by any suitable means such as for instance a screw 44. From an inspection of Figure 1, it will be apparent that the end of the sleeve 43 extends outwardly toward the cutter 25, terminating just short thereof. Mounted upon the sleeve 43 is a second sleeve 45 having a ring 46 secured thereto at the end nearest the frame 2 of the machine as by set screw 47. A thumb screw 48 may be provided in threaded engagement with the ring 46 and is adapted to extend into engagement with the sleeve 43 as through an opening 49 in the sleeve 45. With such an arrangement, it is apparent that the sleeve 45 may be adjusted axially with respect to the sleeve 43 and clamped in the adjusted position by means of the thumb screw 48. At the outer end of the sleeve 45, a flange 50 is provided, which along with the ring 46 forms a guide for the shield 41, it being observed that the shield 41 is provided with an inwardly extending flange 51 adapted to cooperate with the flange 50. With the arrangement just described, it is apparent that the shield 41 will be rotatable relative to the sleeve 45, which latter may be adjusted axially with respect to the sleeve 43 and the shaft 24. The flange 42 on the shield 41 is preferably so extended that upon axial adjustment of the shield 41, the exposed surface of the cutter 25 may be varied. For instance when an operator desires to trim a top lift having a thickness of say 1/8", the thumb screw 48 may be released and the parts moved until a distance of 1/8" exists between the outer end of the flange 42 and the edge of the shield 19 adjacent cutter 25. With the parts thus adjusted, it is apparent that the exposed surface of the cutter is just sufficient to trim the top lift and accordingly any possibility of marring the heel covering is overcome. It is apparent that, although the shield 41 is normally stationary, it may, nevertheless, be rotated as by friction of the heel resting thereagainst during operation.

Figure 4:
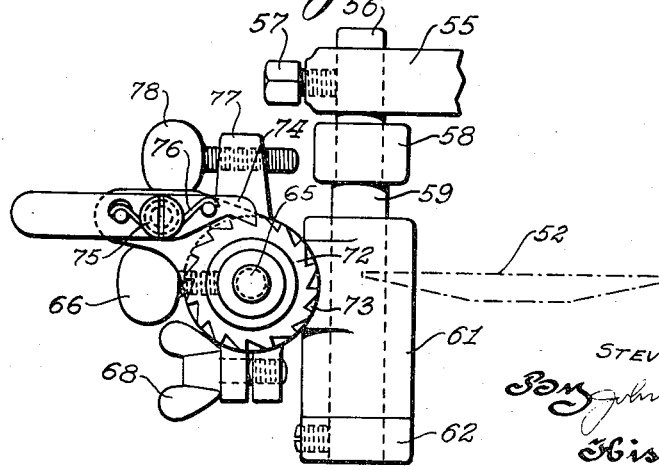
Figure 4 is a plan view of the cutter grinding apparatus shown in Figures 1 and 3 with the cutter removed therefrom.

Upon the opposite end of the shaft 7 from the cutter 8 a suitable grinding device such as for instance an emery wheel 52 may be provided. The emery wheel 52 preferably has its grinding faces shaped generally as illustrated in the dotted lines in Figure 4, in order that the grinding edges thereof may enter the notches such as 53 between the respective teeth 54 of a cutter of the type usually employed for trimming sole edges as the cutter 8 or for trimming heels as the cutter 25. In sharpening such cutters as those employed, 8 and 25, it is necessary to grind the leading edges thereof and in order to accomplish such grinding, the grinding tool necessarily must enter the slot 53. In sharpening such cutters, it is of extreme importance that each of the respective teeth be ground to the same extent and at the same angle, and this invention contemplates a movable support adapted to receive a cutting tool such as 8 or 25 and accurately align the teeth thereof with respect to the grinder 52 during the sharpening operation. The support for thus receiving a cutting tool may be mounted upon the frame 2 in any desired manner such as for instance through a boss 55 which may be attached to or integral with the frame 2 in the region of the grinder 52. The boss 55 may be provided with a suitable recess for receiving a shank 56, which may be adjustable relative to the frame by manipulation of a suitable set screw such as 57. Axial adjustment of the shank 56 relative to the boss 55 will adapt the support to accommodate cutters in which the teeth extend at various angles as will be more clearly apparent from the following description: Extending from the shank 56 is an arm 58 carrying a shaft 59 upon which the cutter support proper may be swiveled as through a bearing 61 engaging the shaft. Any suitable means such as for instance a collar 62 may be provided for maintaining the bearing 61 upon the shaft 59. A barrel 63 which may be integral with the bearing 61 is provided with a cylindrical recess 64 adapted to receive a post 65, so that the the post may be revolved within the recess 64. The barrel 63 may be provided with a suitable thumb screw such as 66 extending into a position for engagement with the post 65 in order to prevent removal thereof from the barrel 63. Mounted upon the barrel 63 in angularly adjustable relation thereto is a split sleeve 67 provided with an adjusting device such as for instance a wing nut 68 in order to clamp the same about the upwardly extending portion 69 of the barrel 63, the split sleeve having an outwardly extending arm 70. A suitable arrangement for accommodating a cutting element such as 8 may be provided on the upper end of the post 65 which may include a suitable knob as 71 for securing the cutting element in position. A notched wheel such as 72 is also secured to the post 65, and in accordance with this invention, the number of notches 73 in the wheel 72 correspond to the number of teeth in the cutter such as 8 to be ground. Accordingly, when cutters having a different number of teeth are to be ground, it is, in accordance with this invention, necessary to employ a different post having a notched wheel 72 provided with a number of notches corresponding to the number of teeth of the cutter to be ground. When the cutter such as 8 has been placed into position upon the post 65, it will be apparent, therefore, that rotation of the shaft 65 within the barrel 63 will rotate both the cutter and the notched wheel 72. Mounted upon the arm 70 extending from the sleeve 67, is a pawl 74 adapted to cooperate with the notches 73 of the notched wheel or ratchet 72. The pawl 74 is pivotally mounted upon a suitable pin or screw such as 75 and is preferably provided with a stiff coil spring 76 adapted to bias the pawl in a clockwise direction as seen in Figure 4. It is preferable that the spring 76 be of sufficient stiffness that in case the notched wheel 72 be stopped so that the end of the pawl 74 is adjacent an inclined portion of the notch 73, the spring will be effective, by virtue of the cooperation of the inclined plane surface of the pawl 74 and a notch 73 to further rotate the notched wheel 72 with the post 65 until the parts reach the position illustrated in Figure 4, in which the pawl is seated in the bottom of the notch 73. Extending from the barrel 63, an arm 77 is preferably provided, having an adjustable screw 78 adapted to engage the arm 58 and limit the movement of the support around the shaft 59 as an axis.

In the operation of the grinding apparatus just described, it is first necessary to select a post 65 having a notched wheel 72 with a number of notches equal to the number of teeth in the cutter to be ground. With the post thus selected, the corresponding cutting tool may be mounted thereupon and secured in position by means of a knob 71. After the post 65 has been inserted into the barrel 63 and the set screw 66 sufficiently tightened to retain the same in position the set screw 57 may be loosened and the shank 56 adjusted therein until the leading edge of a tooth of the cutter such as 8 is aligned with the rear or grinding face of the grinder 52, whereupon the set screw 57 may be again tightened. It will be apparent, therefore, that in the grinding of cutters in which the teeth extend at different angles, the support of this invention may be adapted to receive the various cutters and accurately align the same with reference to the grinder 52, merely by adjusting the shank 56 with relation to the frame. With this first adjustment thus accomplished the support may be rotated about the shaft 59 as an axis until the edge of the grinder 52 is positioned within one of the notches 53, it being understood that the wing nut 68 was preferably loosened prior to this operation so that the split sleeve 67 and the pawl 74 move with the post 65 upon rotation thereof. After the proper angular position of the cutter with reference to the grinder 52 has been thus determined, the wing nut 68 may be tightened in order to prevent relative rotation between the sleeve 67 and the barrel 63. With this adjustment made, it will be apparent that if the post 65 be rotated, it cannot be stopped in such a position that the leading edge of one of the teeth 54 will not be aligned with the grinding face of the grinder 52, since it will be remembered that the notched wheel 72 is provided with a number of notches 73 corresponding to the number of teeth of the cutter to be ground. Accordingly, the pawl 74 operates to arrest the notched wheel 72 and the associated parts, including post 65 and the cutter disposed thereupon in such position that the leading edge of a tooth thereof is always aligned with the grinding face of the grinder 52. After these adjustments have been made, the machine may then be set into operation so that the grinder 52 is rotated and the operator may then swing the cutter support about the shaft 59 as an axis so that the cutter mounted thereupon is moved in the direction indicated by the arrow in Figure 3, until the edge of the grinder 52 is within one of the notches 53. After the leading edge of one tooth has been ground, the operator may swing the support about the shaft 59 in the opposite direction whereupon the post 65 may be revolved, for instance a distance corresponding to one notch of the wheel 72, so that the leading edge of the next adjacent tooth is now aligned with the grinding surface of the grinder 52. This series of operations may then be repeated until each of the teeth of the cutter have been properly ground. With an arrangement of this sort, it is apparent that when it is desired to sharpen such a cutter as that hereinbefore referred to, the grinding operation is accurately accomplished, each tooth being ground at the same angle and to the same extent in view of the fact that the screw 78 will in all events limit the travel of the support toward the grinder. With the use of such a support in the grinding of a cutter, it is apparent that the usual inaccuracy incident to manual operation is avoided and that any cutter may be accurately ground regardless of the skill of the workman. It may be pointed out that such a support for grinding a cutter of this character is not limited to its use to a machine of the type which has been hereinbefore referred to, but is susceptible of general use in the various arts in which such cutters are employed.

From the foregoing description, it is apparent that many modifications of the machine hereinbefore described, and illustrated in the accompanying drawings, will present themselves to those skilled in the art which will not depart from the spirit of this invention. It is to be distinctly understood, therefore, that the invention is not limited to the specific details set forth in the foregoing description and illustrated in the accompanying drawings, but that such modifications thereof and the use of such individual features and sub-combinations of features, in the same, as well as in other relations than that of the illustrated embodiment, are, although not specifically described herein, contemplated by and within the scope of the appended claims.

Having thus described the invention, what is claimed is:

1. A device of the kind described comprising, a shaft, a tool detachably mounted on said shaft, a shield having portions extending in protecting relation to the cutting edges of said tool, adjustable means gripping said shaft to position the shield, said adjustable means having a manipulable portion protruding on the exterior of said shield, and a continuous circumferential protecting member overlying said manipulable portion.

2. A device of the kind described comprising, a shaft, a tool detachably mounted on said shaft, a stationary sleeve surrounding said shaft and extending into a position substantially close to said tool, a second sleeve carried by said first sleeve in adjustable and floating relation thereto, said second sleeve having portions extending in protecting relation to said tool, and means for holding said second sleeve against axial displacement.

3. A device of the kind described, comprising, a hollow shaft, a cutter having a bore fitting on the end of said shaft, a clamping element fitting in the bore of said shaft and having a part engaging said cutter, a guard for said cutter loosely mounted on said clamping element, and a member extending through said shaft and having manipulating means at the other end thereof adapted to operate said clamping element to secure said cutter.

4. A device of the kind described, comprising, a hollow shaft, a cutter having a bore fitting on the end of said shaft, a sleeve fitting the bore of said shaft and having a flange adapted to bear against said cutter, and a clamping screw within said shaft engaging said sleeve and having a manipulating element at the other end of said shaft.

STEVENSON A. DOBYNE.